(12) United States Patent
Bakaya et al.

(10) Patent No.: US 10,557,088 B2
(45) Date of Patent: Feb. 11, 2020

(54) CONVERSION OF POLYMER CONTAINING MATERIALS TO PETROLEUM PRODUCTS

(71) Applicant: PK Clean Technologies Inc., Salt Lake City, UT (US)

(72) Inventors: Priyanka Bakaya, Salt Lake City, UT (US); Benjamin Ralph Coates, Salt Lake City, UT (US)

(73) Assignee: PK Clean Energy Pte Ltd, Singapore (SG)

( * ) Notice: Subject to any disclaimer, the term of this patent is extended or adjusted under 35 U.S.C. 154(b) by 0 days.

(21) Appl. No.: 15/490,672

(22) Filed: Apr. 18, 2017

(65) Prior Publication Data

US 2017/0218278 A1    Aug. 3, 2017

Related U.S. Application Data

(62) Division of application No. 14/455,927, filed on Aug. 10, 2014, now Pat. No. 9,624,439.

(51) Int. Cl.
*C10B 47/44* (2006.01)
*C10B 53/07* (2006.01)
(Continued)

(52) U.S. Cl.
CPC .............. *C10G 1/10* (2013.01); *B01J 4/007* (2013.01); *B01J 8/10* (2013.01); *B01J 19/28* (2013.01);
(Continued)

(58) Field of Classification Search
None
See application file for complete search history.

(56) References Cited

U.S. PATENT DOCUMENTS

| 386,664 | A | * | 7/1888 | Solvay | C01B 17/58 422/210 |
| 2,357,621 | A | * | 9/1944 | Tuttle | C10B 55/00 202/118 |

(Continued)

FOREIGN PATENT DOCUMENTS

| DE | 3542699 A1 * | 6/1987 | .......... F26B 11/0463 |
| DE | 3641731 A1 * | 6/1988 | ................ F27B 7/18 |

(Continued)

OTHER PUBLICATIONS

English Abstract for DE 4237161 A1 (May 1994).*

(Continued)

*Primary Examiner* — Jennifer A Leung
(74) *Attorney, Agent, or Firm* — Intellectual Strategies

(57) ABSTRACT

Systems and methods achieve the conversion of polymer containing material into petroleum products such as hydrocarbon gas, wax, crude oil and diesel. The reactor and its system are designed to subject the polymer containing material to pyrolysis in a way that results in a higher petroleum product yield than conventional existing systems. The system has controls which allow for the heating temperature, rotation of the body, and throughput rate, to be adjusted depending on the reaction time required for the material inside the reactor. The condensing system is able to separate the products into the desired petroleum products by percentage output ranging from wax to crude-like oil to diesel-quality oil.

20 Claims, 22 Drawing Sheets

A flow diagram of the system of the present invention.

(51) Int. Cl.
    *C08J 11/12*      (2006.01)
    *C10G 1/10*      (2006.01)
    *C10B 47/48*      (2006.01)
    *B01J 19/28*      (2006.01)
    *B01J 8/10*      (2006.01)
    *C10B 47/34*      (2006.01)
    *B01J 4/00*      (2006.01)
    *C10B 1/10*      (2006.01)
    *C10B 7/10*      (2006.01)
    *C10B 47/30*      (2006.01)
    *C10B 57/06*      (2006.01)

(52) U.S. Cl.
CPC ............. *C08J 11/12* (2013.01); *C10B 1/10* (2013.01); *C10B 7/10* (2013.01); *C10B 47/30* (2013.01); *C10B 47/34* (2013.01); *C10B 47/44* (2013.01); *C10B 47/48* (2013.01); *C10B 53/07* (2013.01); *C10B 57/06* (2013.01); *B01J 2204/005* (2013.01); *B01J 2208/00752* (2013.01); *B01J 2208/00867* (2013.01); *B01J 2208/00938* (2013.01); *B01J 2219/187* (2013.01); *Y02P 20/143* (2015.11)

(56) References Cited

U.S. PATENT DOCUMENTS

| | | | | |
|---|---|---|---|---|
| 4,140,478 A | * | 2/1979 | Kawakami | C10B 1/10 202/136 |
| 5,225,044 A | * | 7/1993 | Breu | C10B 1/10 201/26 |
| 8,444,828 B2 | * | 5/2013 | Wolfe | C10B 47/44 201/15 |
| 9,624,439 B2 | * | 4/2017 | Bakaya | C10G 1/10 |
| 2006/0289287 A1 | * | 12/2006 | Maskarinec | C10B 53/07 202/118 |
| 2010/0065410 A1 | * | 3/2010 | Li | B65G 33/18 201/2 |
| 2011/0266377 A1 | * | 11/2011 | Lindner | B03B 5/28 241/24.1 |
| 2012/0261247 A1 | * | 10/2012 | McNamara | C10B 47/18 201/25 |
| 2013/0240343 A1 | * | 9/2013 | Wolfe | C10J 3/007 201/5 |
| 2013/0245345 A1 | * | 9/2013 | Hutchon | C10B 53/07 585/240 |
| 2015/0080624 A1 | * | 3/2015 | Gephart | C10G 1/10 585/241 |

FOREIGN PATENT DOCUMENTS

| | | | | |
|---|---|---|---|---|
| DE | 4237161 A1 | * | 5/1994 | ............ B03B 9/061 |
| GB | 717379 A | * | 10/1954 | ............ B01F 7/041 |
| JP | 57102987 A | * | 6/1982 | |
| JP | 2002053697 A | * | 2/2002 | |
| WO | WO 2011034409 A1 | * | 3/2011 | ............ C10B 47/30 |
| WO | WO 2013015819 A1 | * | 1/2013 | ............ C10L 1/04 |

OTHER PUBLICATIONS

Abstract and machine translation for DE 3542699 A1 (Jun. 1987).*
Abstract and machine translation for JP 57-102987 A (Jun. 1982).*
Abstract and machine translation for JP 2002-053697 A (Feb. 2002).*

* cited by examiner

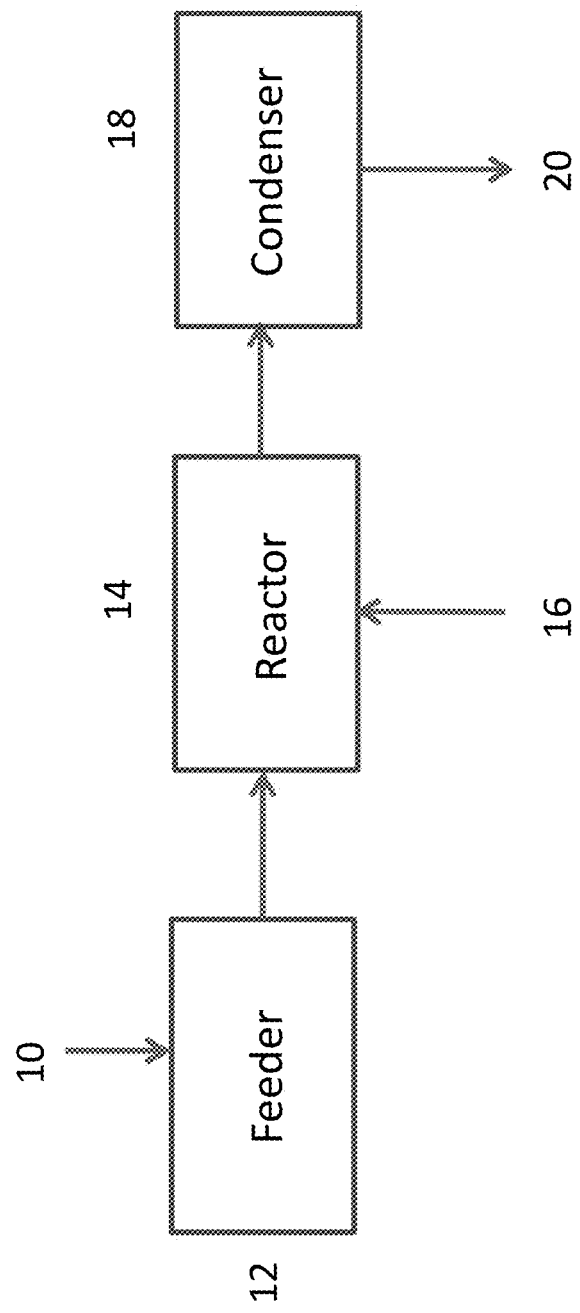
Figure 1: A flow diagram of the system of the present invention.

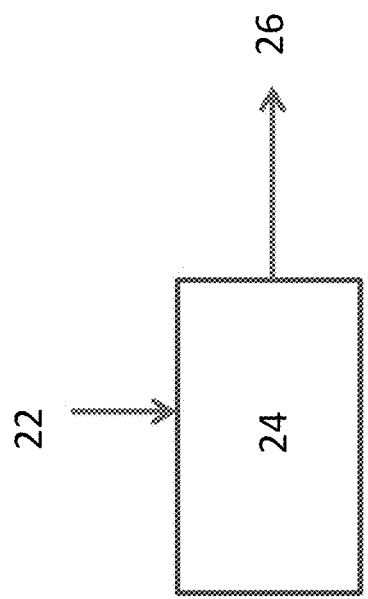
Figure 2: A view of one embodiment of the feed process

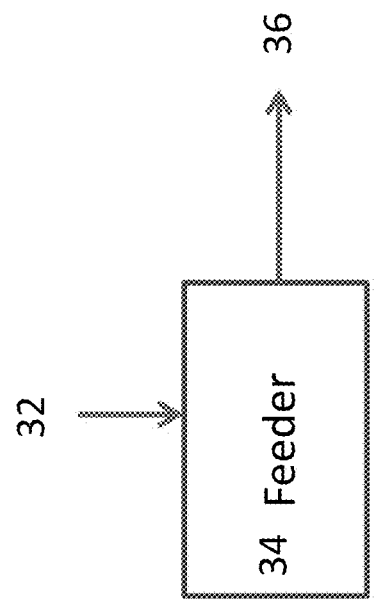
Figure 3: An alternative view of one embodiment of the feed process

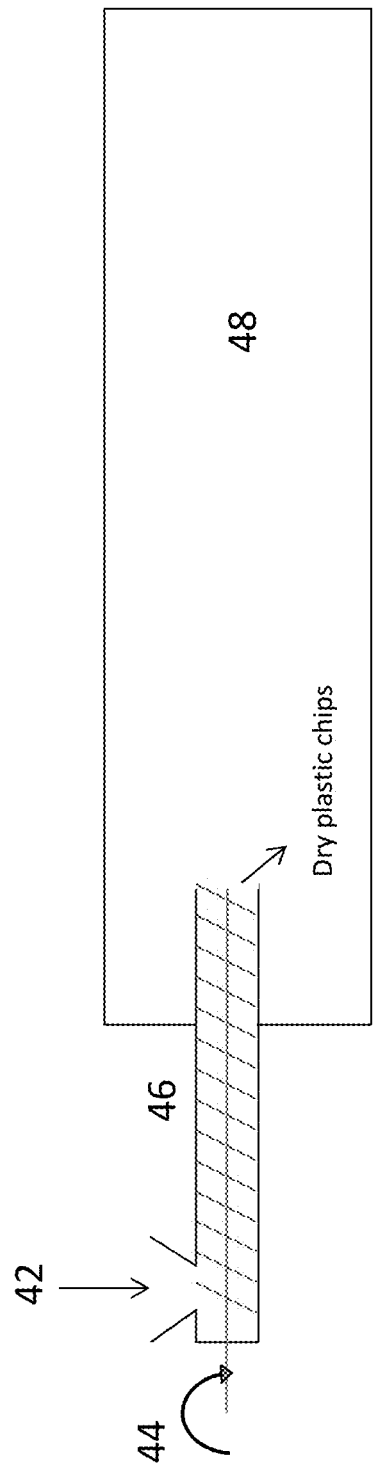
Figure 4: A view of the feedstock being fed into the reactor body

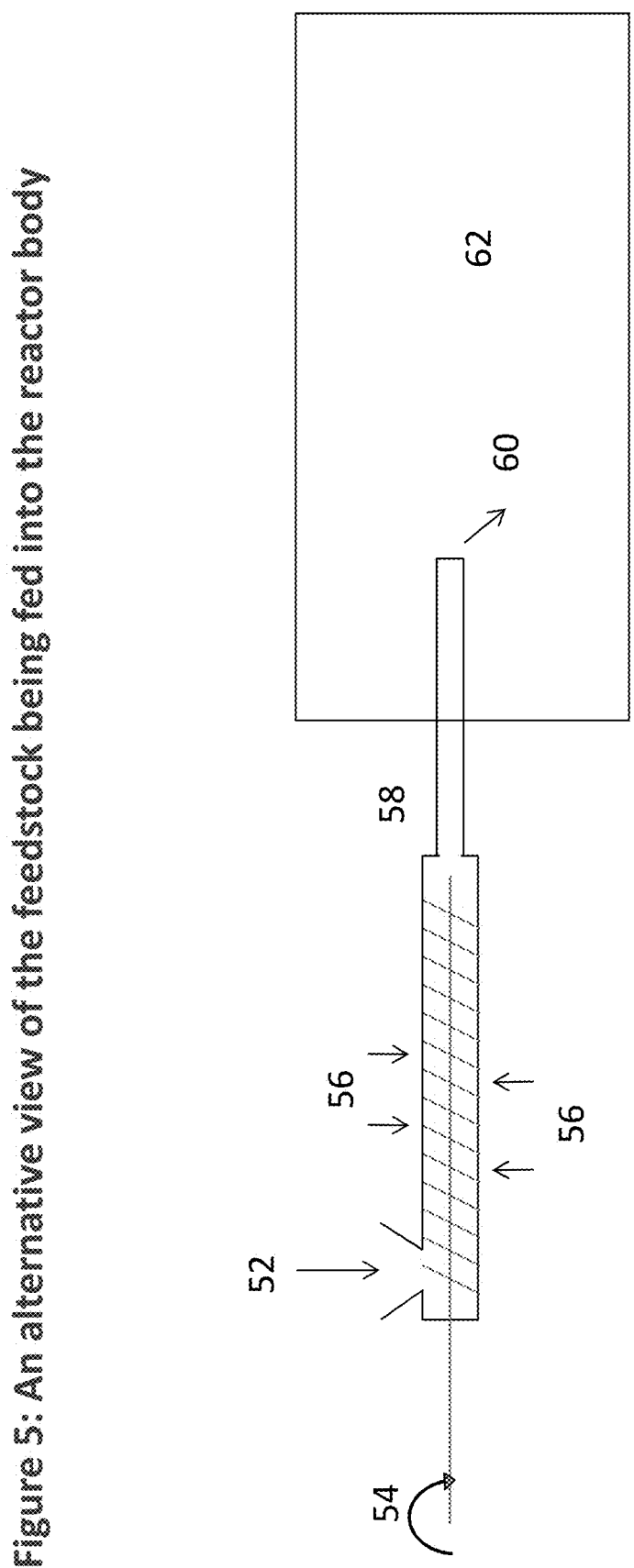
Figure 5: An alternative view of the feedstock being fed into the reactor body

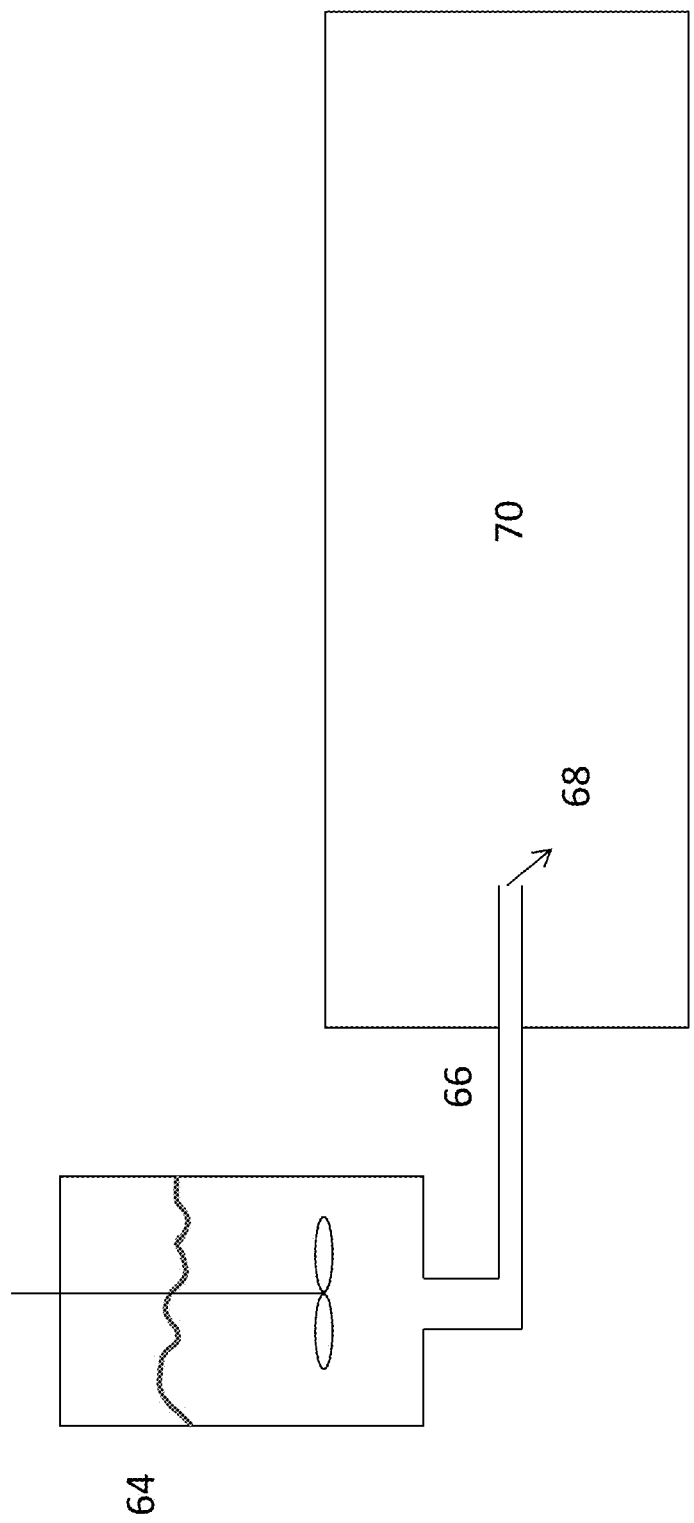

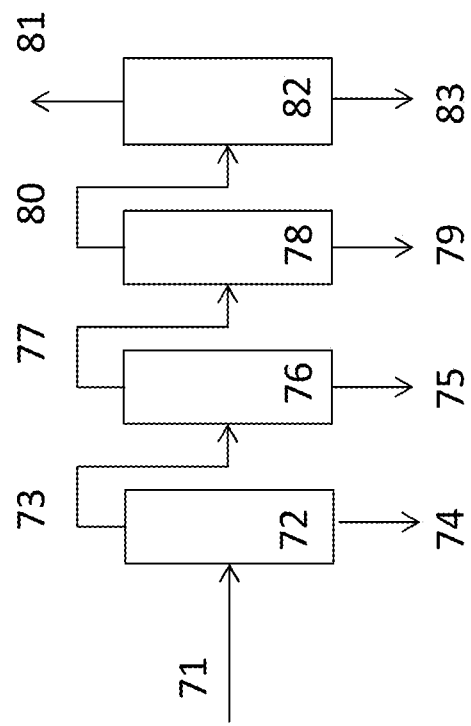
Figure 7: A view of the vertical section of a condenser

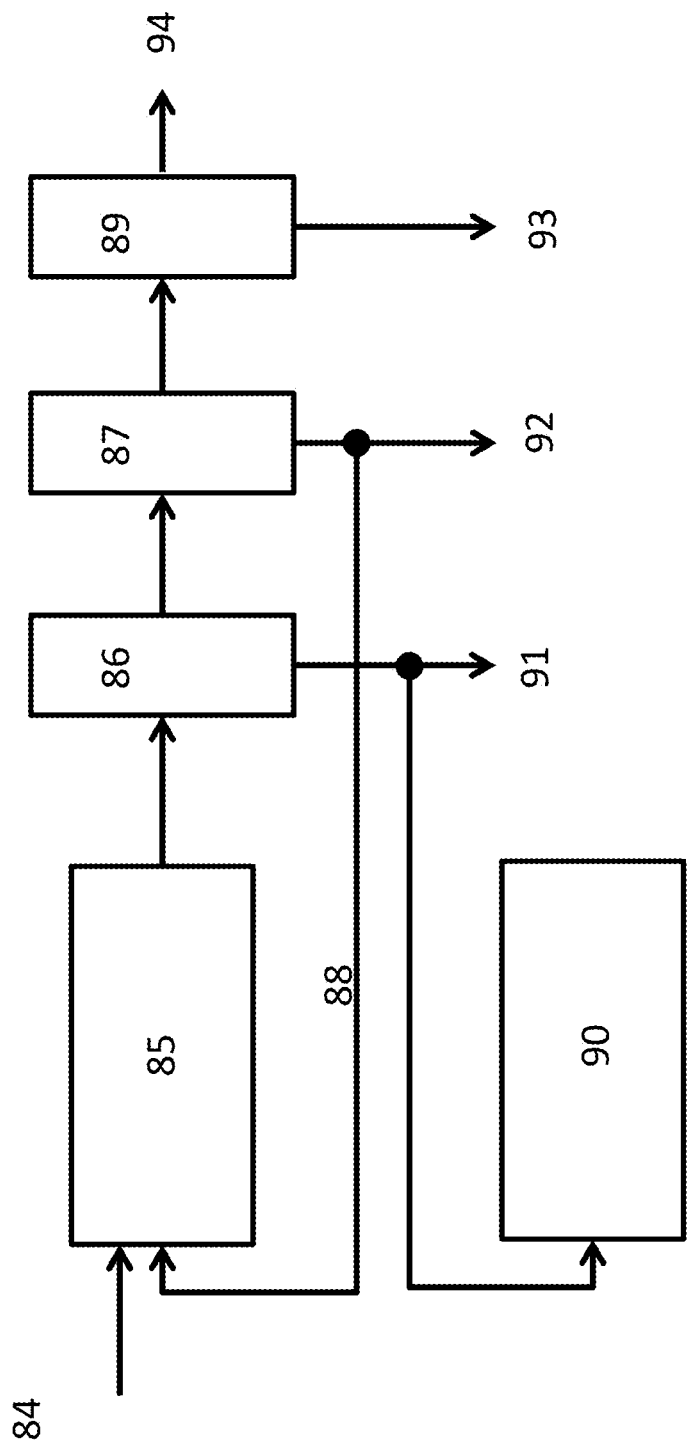

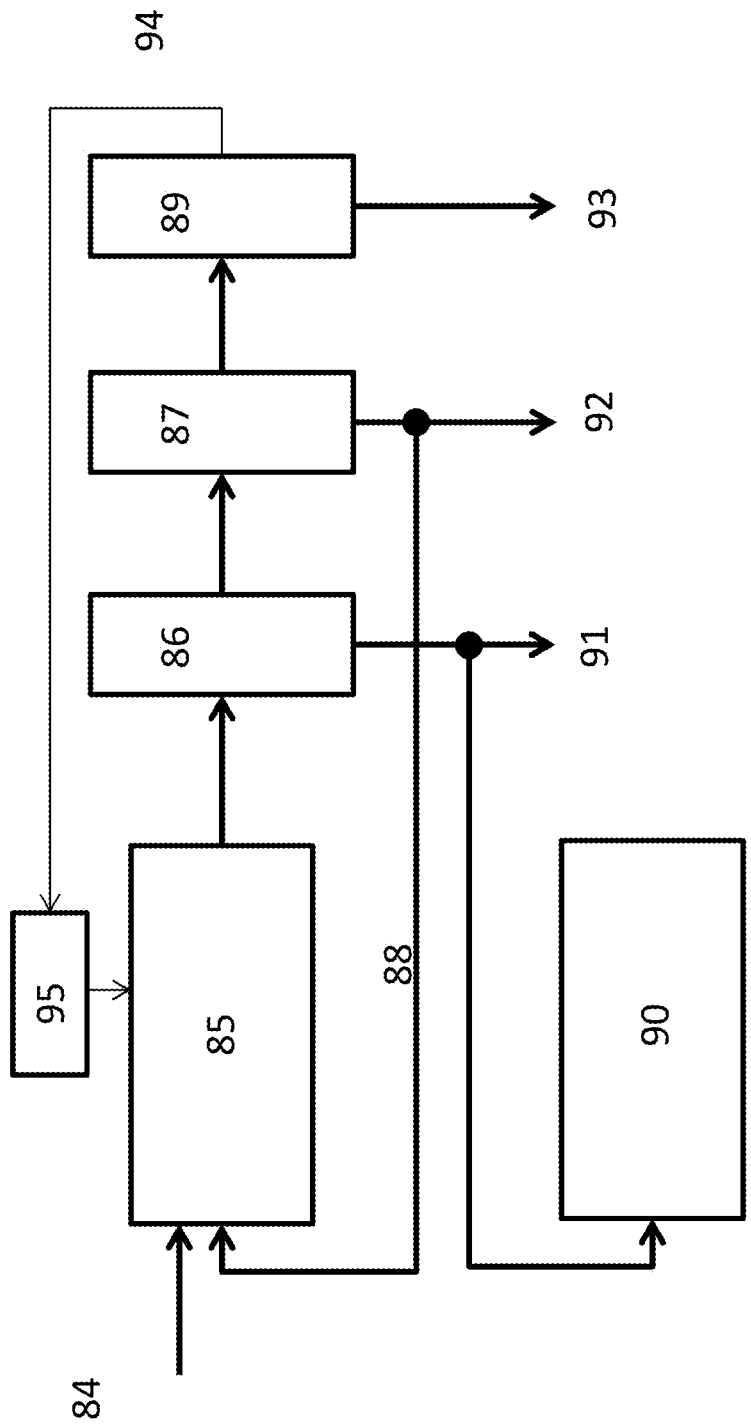
Figure 9: A flow diagram showing an embodiment of the invention with the vapor gas product used to heat the reactor

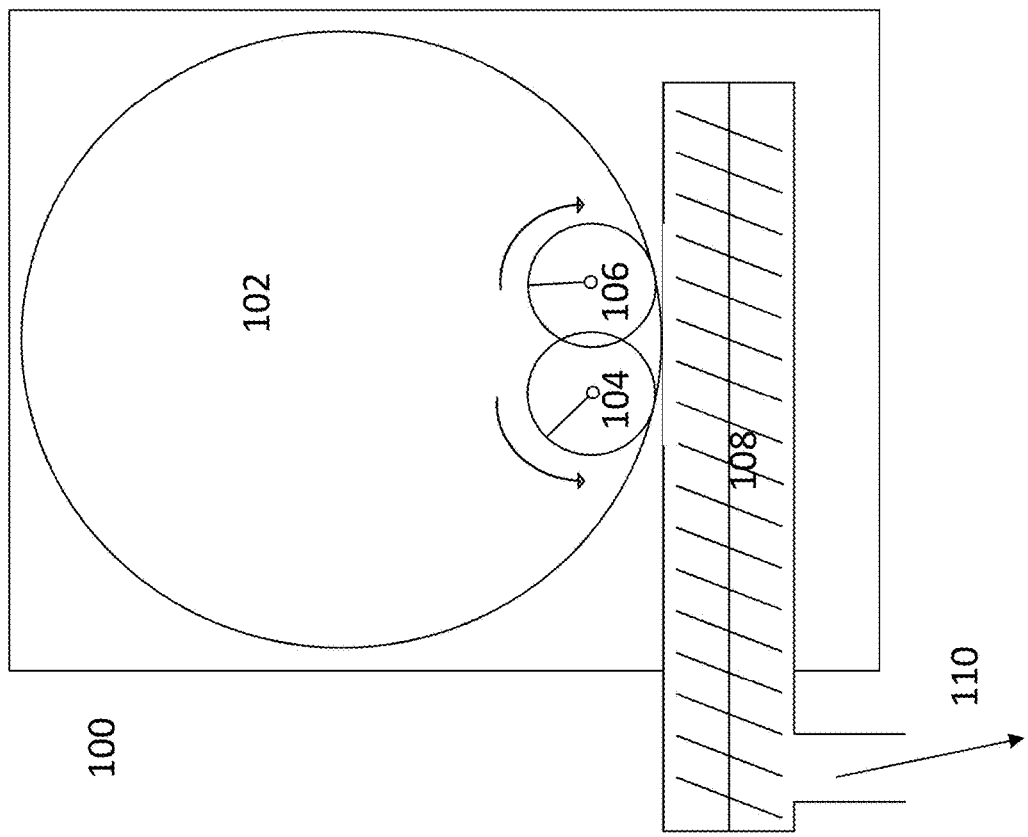
Figure 10: A view of the back end of the reactor body with one additional auger to remove the residue

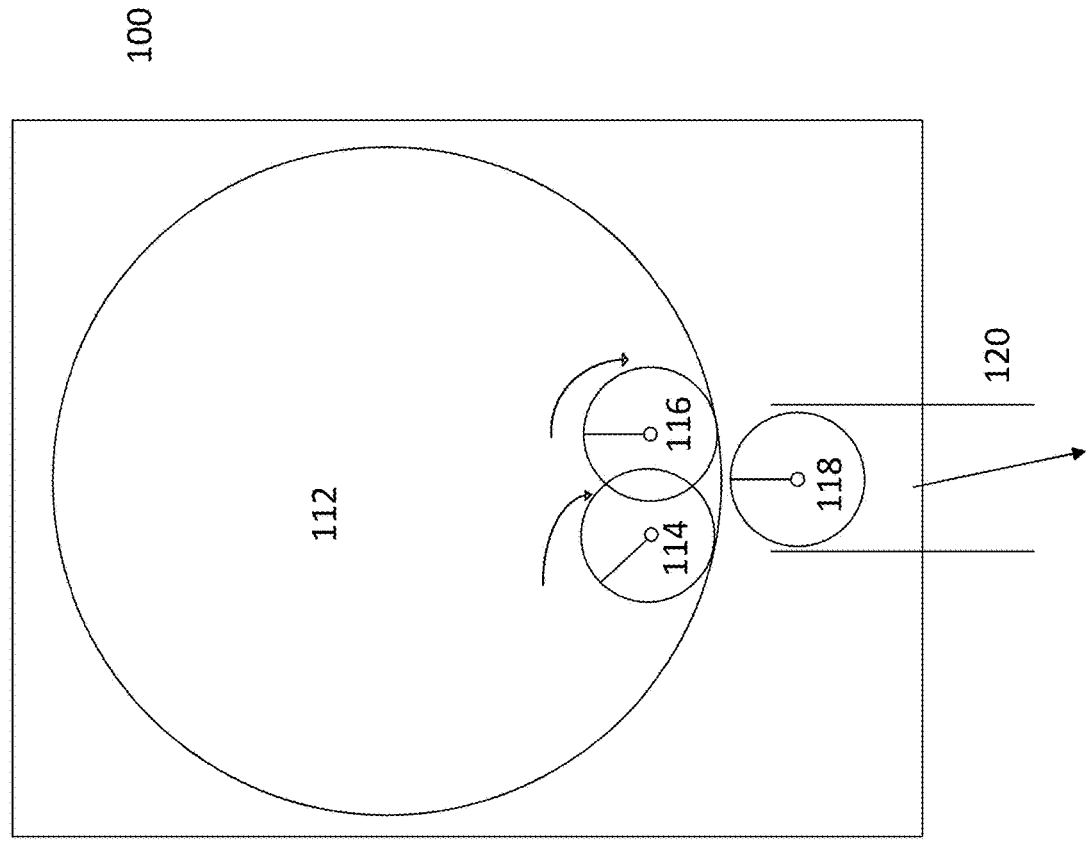
Figure 11: An alternative view of the back end of the reactor body with a secondary auger to remove the residue

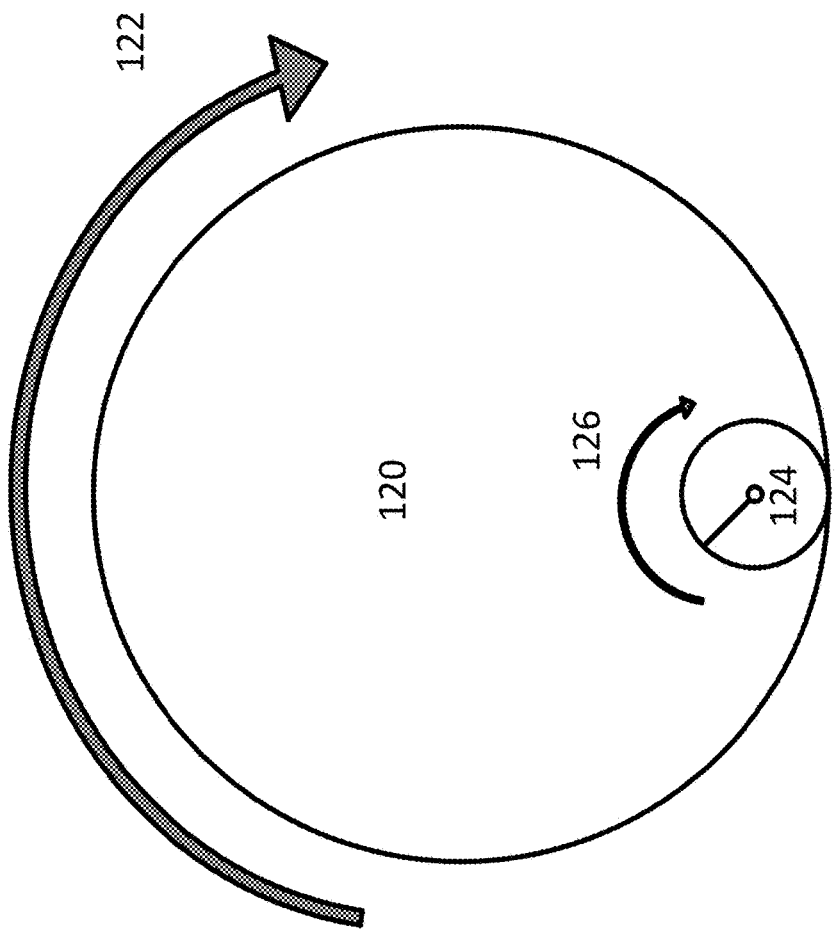
Figure 12: A view of the front end of the reactor body and an embodiment of how the internal auger can rotate

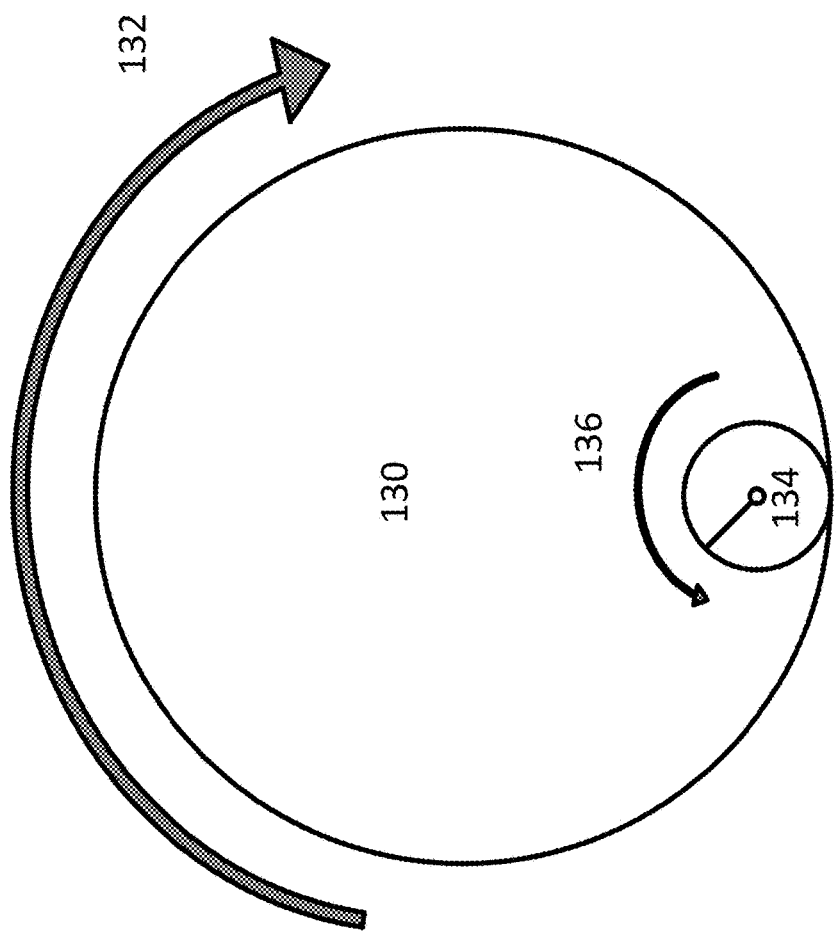
Figure 13: A view of the front end of the reactor body and an embodiment of how the internal auger can counter-rotate

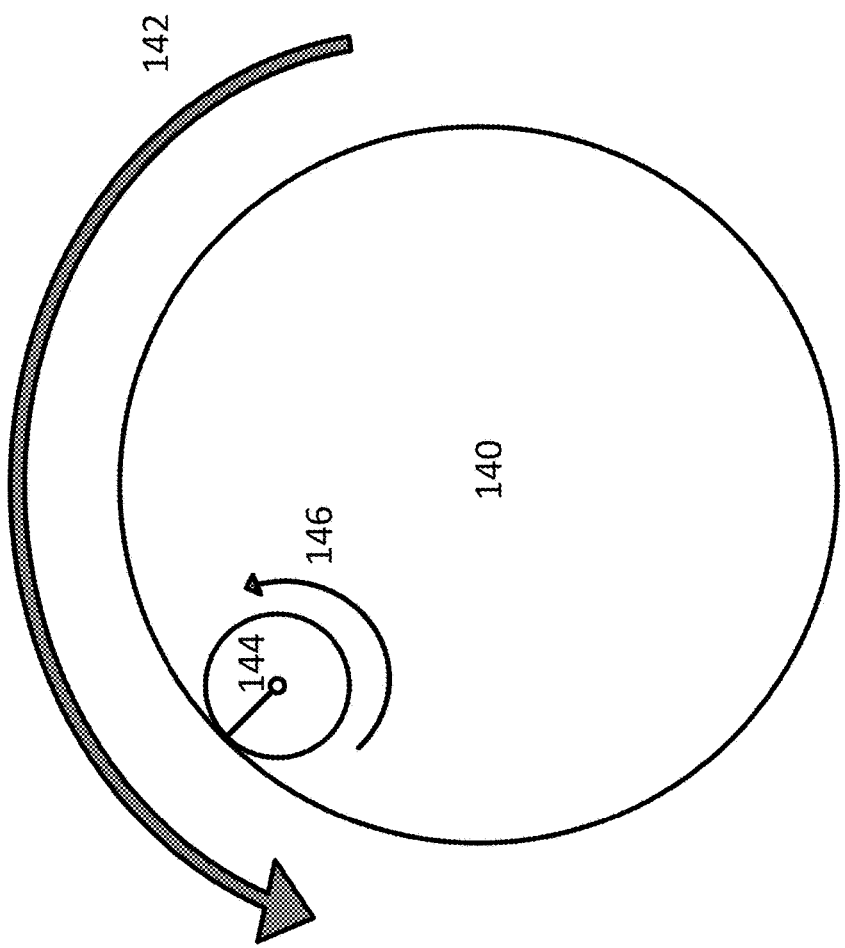
Figure 14: A view of the front end of the reactor body and an embodiment of how the internal auger can rotate around the body

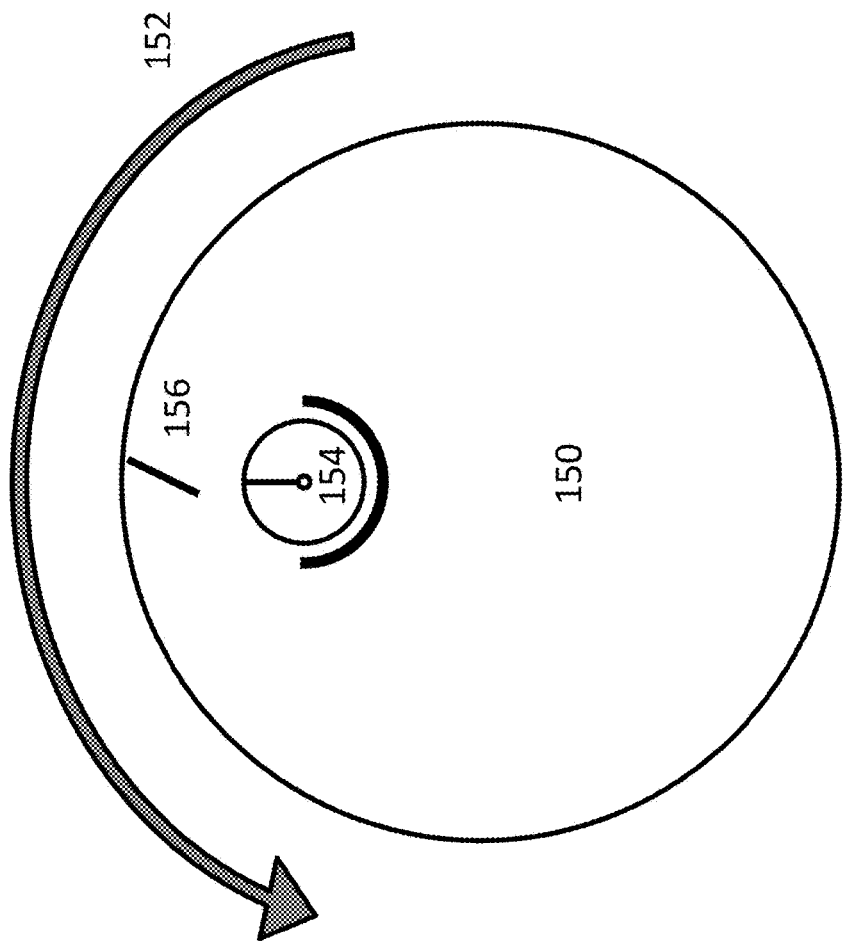
Example of stationary scraper with auger in trench to remove solids that have fallen
Figure 15: A view of the front end of the reactor body and an embodiment of how the internal auger can rotate with the use of a scraper

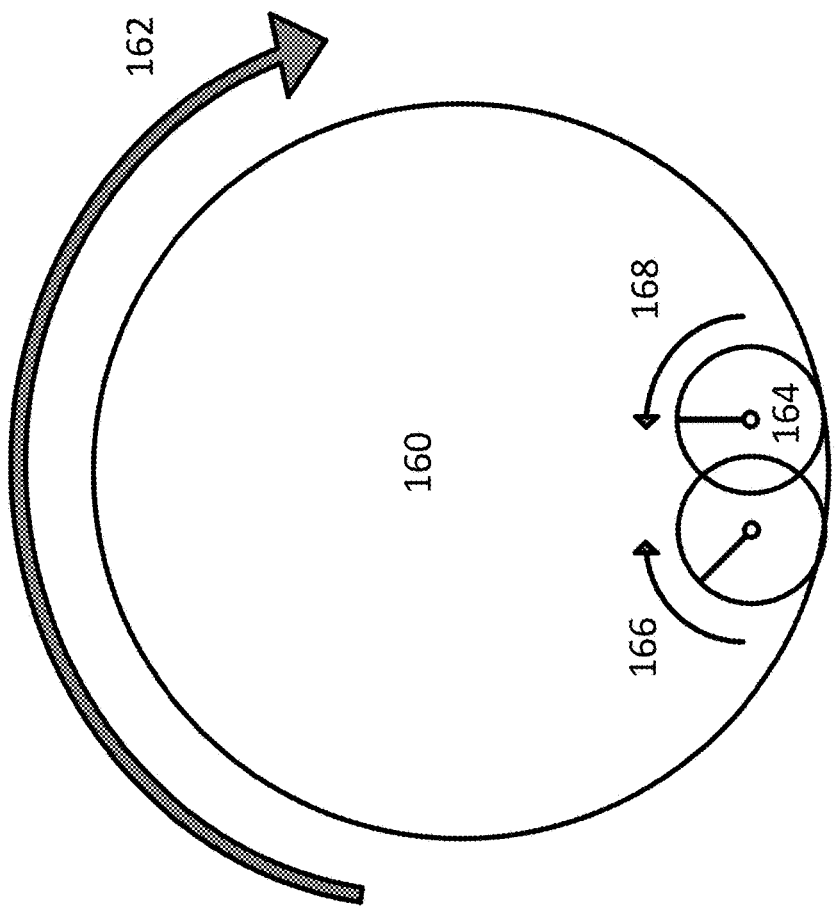
Figure 16: A view of the front end of the reactor body and an embodiment of how two internal counter rotating augers can work

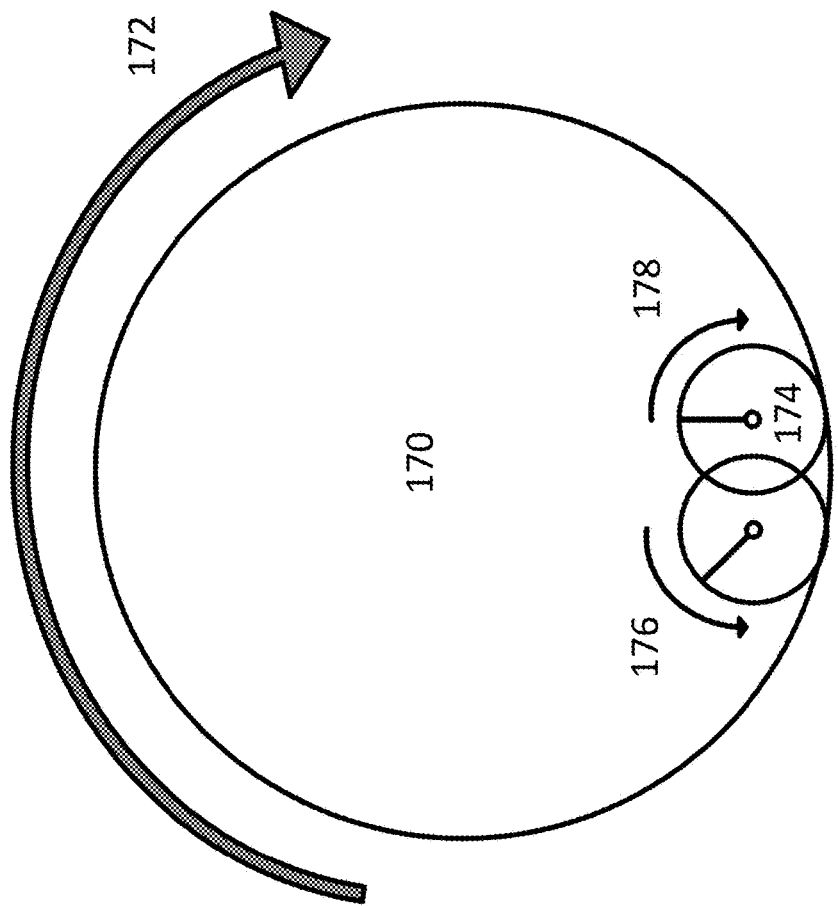
Figure 17: An alternate view of the front end of the reactor body and an embodiment of how two internal counter-rotating augers can work

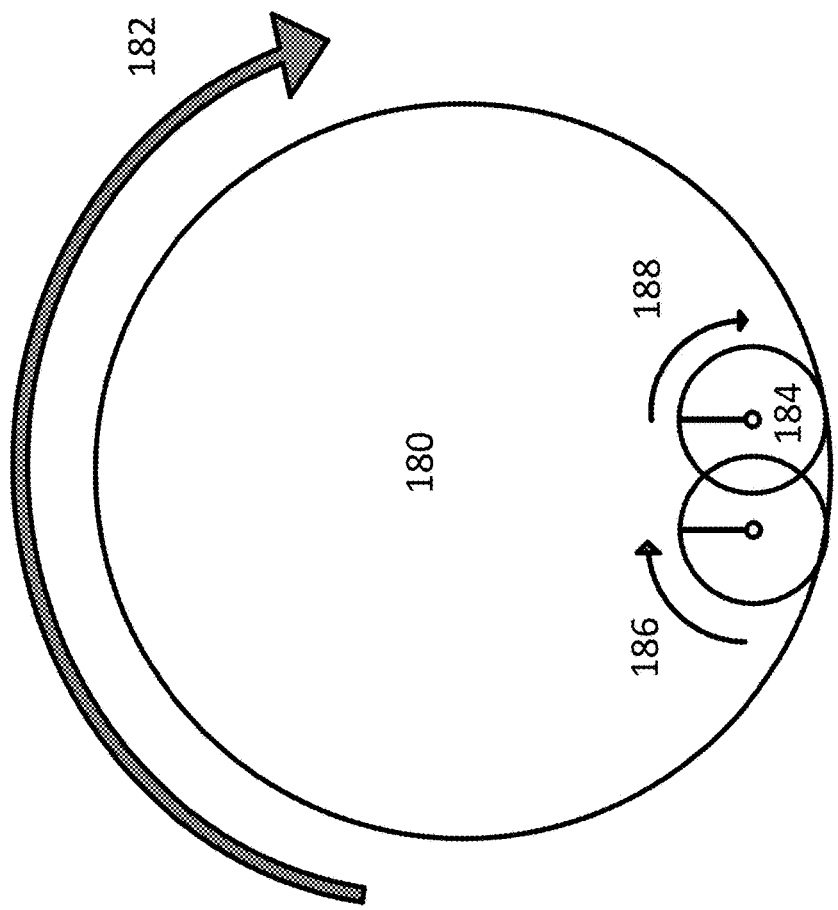
Figure 18: A view of the front end of the reactor body and an embodiment of how two internal co-rotating augers can work

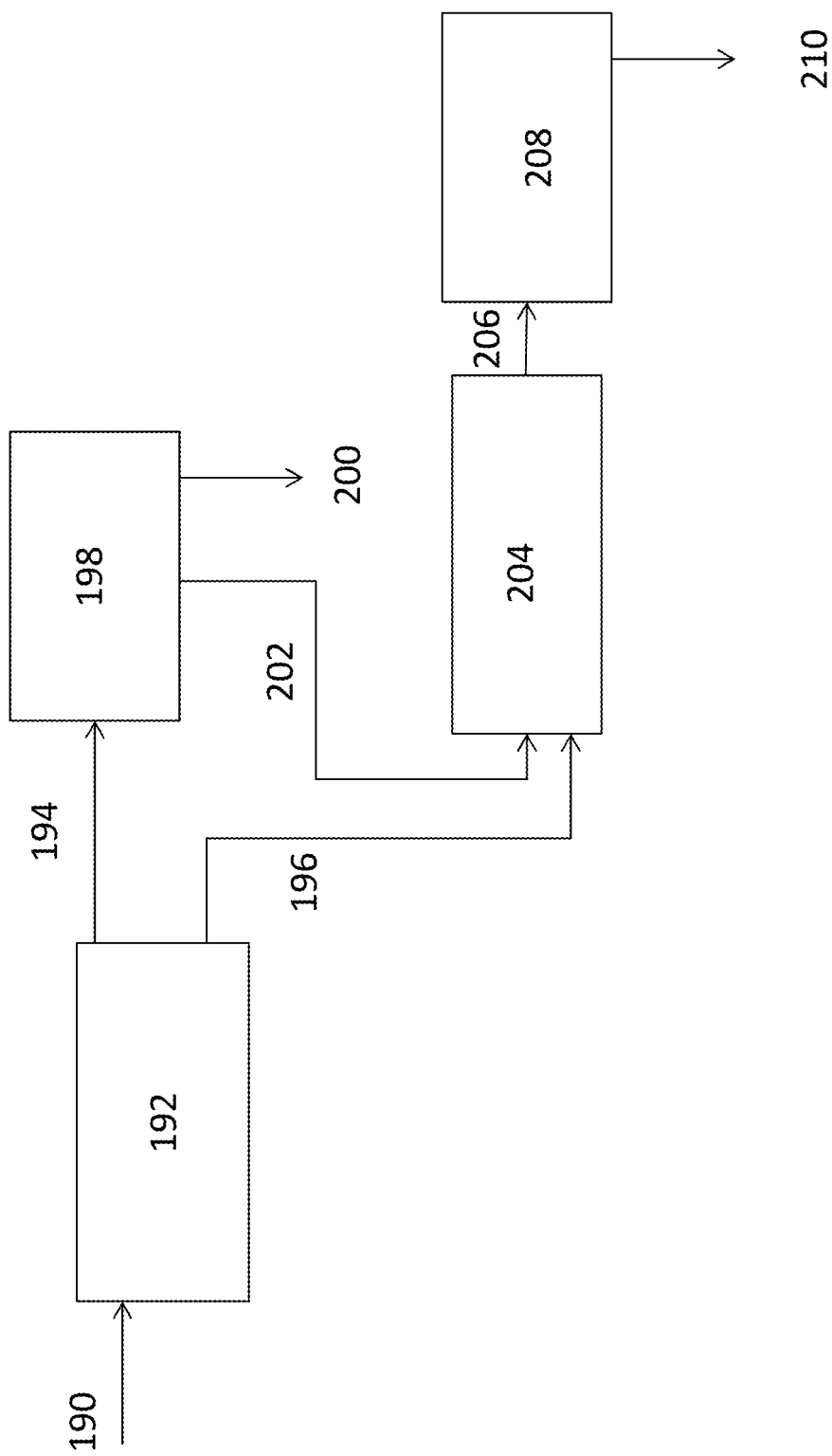
figure 19: A flow diagram showing an embodiment of the invention with two reactor bodies using two condenser systems

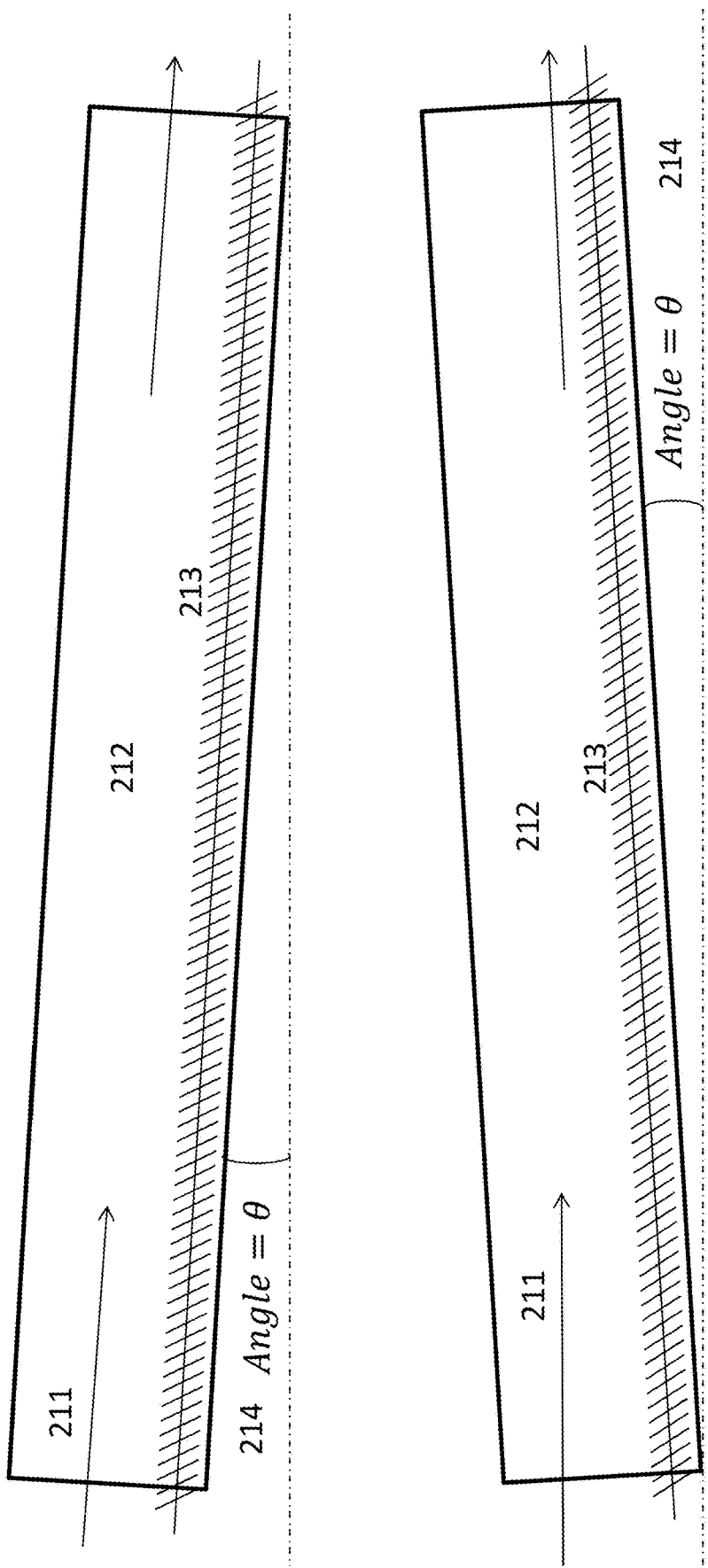
Figure 20: A view of the longitudinal side of the reactor body with an embodiment of the mechanism which alters the slope angle

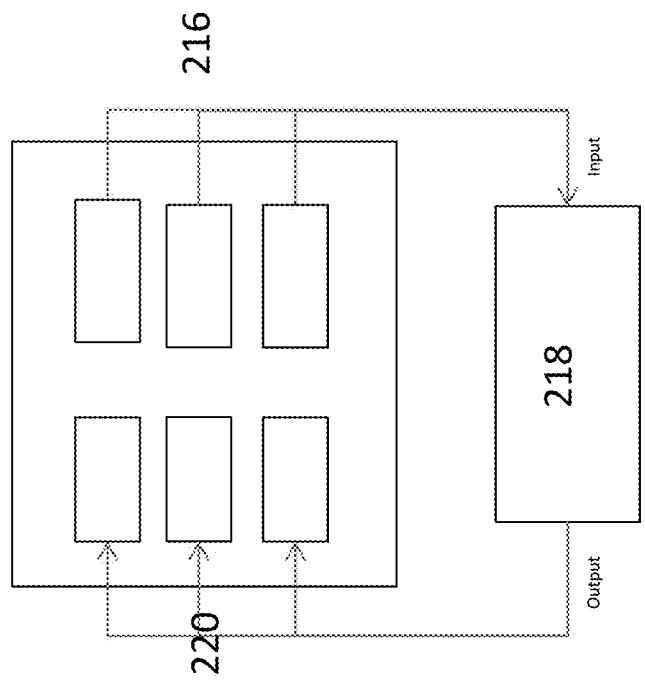
Figure 21: A flow diagram showing an embodiment of the invention with a control system that monitors several parameters and has the ability to modify those parameters.

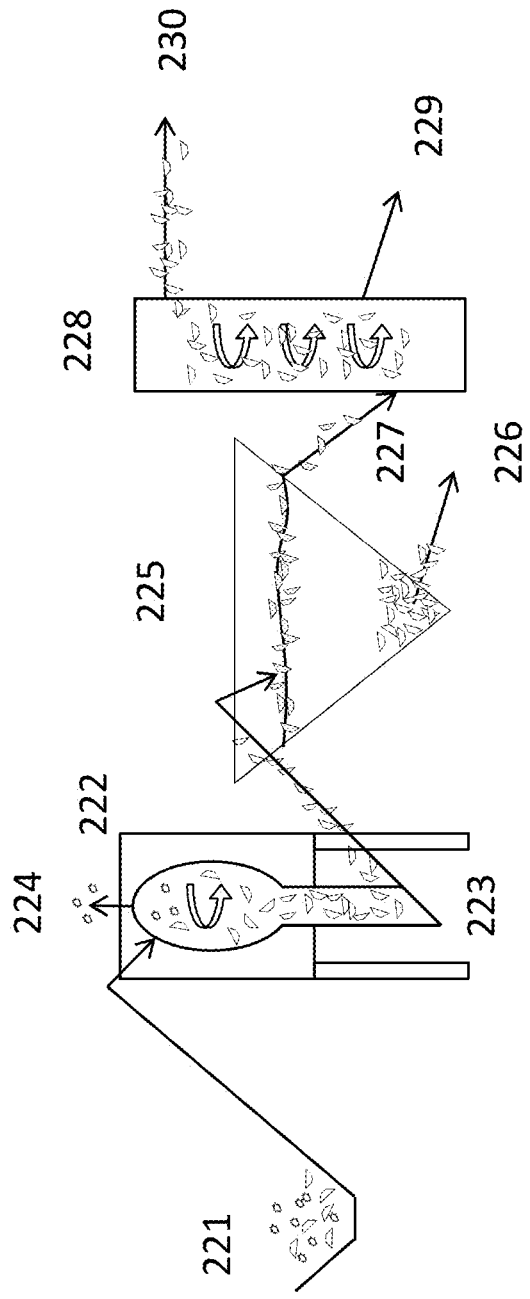
Figure 22: A side view of a pre-reactor process that includes several apparatus designed to prepare the polymer containing materials for conversion in the reactor.

CONVERSION OF POLYMER CONTAINING MATERIALS TO PETROLEUM PRODUCTS

Embodiments of the invention relate to systems and methods for converting polymer containing materials to petroleum products such as hydrocarbon gases, wax, crude oil and diesel.

BACKGROUND

Conventional technology is directed to converting polymer containing materials such as plastic into petroleum products including crude oil. Unfortunately, conventional technology is limited to relatively low crude oil and diesel yields, slower throughput, higher operating costs, and higher capital expenses.

SUMMARY

Embodiments of the invention address several limitations of other technologies. In some embodiments, the reactor, the system and the method used lead to a higher yield of crude oil and diesel, with a quicker throughput rate, on a lower operating expense, and at a lower capital expense. Specifically, the focus is on producing as much diesel-quality oil as possible and minimize the wax that other technologies create by ensuring an ideal reaction time, and allowing lower carbon chains more time to develop into diesel. Further, embodiments of the reactor allow for a shorter reaction time that results in more polymer containing materials converting into vapors that lead to petroleum products each minute and hence each hour and day. In addition, embodiments of the reactor are designed such that the process can be run continuously 24 hours per day, 7 days per week, thus increasing or maximising output. In some embodiments, the overall system is intended to be as automated as possible so that minimal intervention is required, thus requiring a small workforce of 1-3 employees. Finally, the design of the system, in particular the reactor, does not require significant capital expenditure to build. This means that the system can have a shorter payback period than others available for sale.

In some embodiments, the invention includes a system and method for producing petroleum products such as wax, gas and oil by the pyrolysis of polymer containing materials and the subsequent condensation of the resultant vapors. The polymer containing material is initially pre-processed as necessary depending on the composition of the polymer containing material (if known). Once the polymer containing material enters the system it is pre-melted and moved into the reactor body where it is subjected to a similar or higher temperature. The reactor includes a generally horizontal cylindrical body that has an inlet at the first end, at least one outlet at the other end and which is sealed (from outside atmosphere) on both ends, with an inclined slope of the body off of horizontal, external heating applied along one or more sides of the body, and one or more internal rotating augers. The body of the reactor is designed with the ability to rotate the body. Also, the ability to vary the revolutions per minute of the rotating body is possible and dependent on the reaction needs.

The condensers used in the invention include several in a process, as well as additional condensing systems. The pressure and temperatures within each condenser can be adjusted so that different percentages of petroleum products are produced. In some embodiments the system includes more than one reactor to be used either in sequence or in parallel. The additional reactors can be used for both additional polymer containing materials as well as for that which remains unreacted after going through a reactor. This allows for higher throughput rate, as well as higher yield.

In some embodiments the invention includes the use of a control mechanism which allows different parameters of the system to be captured and monitored. If certain parameters are found to be outside the desired range, they can be adjusted either manually by users or automatically through the control mechanism. In some embodiments the system and method includes processing the feedstock of polymer containing materials prior to them entering the reactor and reaction stage. This is done to remove unwanted particles such as dust and fibers, as well as to separate out undesired polymer containing materials.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Various embodiments of the present invention are shown and described in reference to the numbered drawings wherein:

FIG. 1 is a flow diagram of one embodiment of the system of the present invention.

FIG. 2 is a view of one embodiment of the feeder.

FIG. 3 is an alternative view of one embodiment of the feeder.

FIG. 4 is a view of the feedstock being fed into the reactor body.

FIG. 5 is an alternative view of the feedstock being fed into the reactor body.

FIG. 6 is a view of one embodiment of the feeder.

FIG. 7 is a view of the vertical section of the condenser.

FIG. 8 is a flow diagram of the embodiment of the invention with a second reactor body.

FIG. 9 is a flow diagram showing an embodiment of the invention with the vapor gas product used to heat the reactor.

FIG. 10 is a view of the back end of the reactor body with one additional auger to remove the residue.

FIG. 11 is an alternative view of the back end of the reactor body with a different auger to remove the residue.

FIG. 12 is a view of the front end of the reactor body and an embodiment of how the internal auger can rotate.

FIG. 13 is a view of the front end of the reactor body and an embodiment of how the internal auger can counter-rotate.

FIG. 14 is a view of the front end of the reactor body and an embodiment of how the internal auger can rotate around the body.

FIG. 15 is a view of the front end of the reactor body and an embodiment of how the internal auger can rotate with the use of a scraper.

FIG. 16 is a view of the front end of the reactor body and an embodiment of how two internal counter rotating augers can work.

FIG. 17 is an alternate view of the front end of the reactor body and an embodiment of how two internal counter-rotating augers can work.

FIG. 18 is a view of the front end of the reactor body and an embodiment of how two internal co-rotating augers can work.

FIG. 19 is a flow diagram showing an embodiment of the invention with two reactor bodies using two condenser systems.

FIG. 20 is a view of the longitudinal side of the reactor body with an embodiment of the mechanism which alters the slope angle.

FIG. 21 is a flow diagram showing an embodiment of the invention with a control system that monitors several parameters and has the ability to modify those parameters.

FIG. 22 is a side view of a pre-reactor process that includes several apparatus designed to prepare the polymer containing materials for conversion in the reactor.

It is intended that the drawings are illustrative of the broader scope and embodiments of the invention, and the embodiments of the invention are not limited to these figures.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, an embodiment of an apparatus converts polymer containing materials into petroleum products (mostly oil) at various boiling ranges. FIG. 1 shows that the apparatus includes a feeder part 12, a reactor part 14, and a condenser system part 18. Polymer containing material is fed through an inlet 10 in the feeder, and heat is applied to the reactor 16, while there is an outlet from the condenser for the product to exit from 20.

The polymer containing material fed into the feeder can include chips, shredded, ground, or any other type of shape containing at least a portion of polymer material. The size of polymer containing material is only constrained by the size of the feeder. Using a smaller size (one-half inch minus) makes the bulk material denser and makes it easier to move the bulk material at a consistent mass flow. The polymer containing material may be fed from the feeder into the reactor as either a dry feed or a hot melt feed. FIG. 2 shows that the polymer containing material feed is fed through an inlet 22 into the feeder 24 from which ambient polymer containing material at a temperature range of 30-125° F. exits 26.

FIG. 3 shows that the same polymer containing material feed 32 can be put through the feeder 34 and heated to produce hot melted polymer containing material 36 which exits at a temperature range of 250-600° F. At this elevated temperature the material is melted to a point where it is closer to a liquid consistency. Having the material enter the reactor at an elevated temperature helps keep the reactor temperature steady as introducing colder material drops the overall temperature of material in the reactor. The feeder can be used to increase the density of the material as well as to pre-heat the material before it is brought to the reactor.

FIG. 4 shows that the polymer containing material 42 can be metered from the feeder 46 into the reactor 48 with an auger or screw 44. The revolutions per minute of the auger or screw determine the mass flow rate of the material. The auger can be cooled with a cooling jacket to prevent the polymer containing material from pre-melting as it travels through the screw. In one embodiment, the feed mechanism extends from the feeder into the reactor body.

FIG. 5 shows the mechanical force 54 which results in viscous heating, in addition to external heating 56, serve to melt the polymer containing material 52 while pushing the material forward. The RPM of the auger or screw determines the mass flow of the material. Once the material is sufficiently melted it can be pushed through a channel 60 into the reactor 62.

FIG. 6 shows an alternative feeder 64, in this case a melt vessel, in which the feed of melted wax, hot oil, melted material, or a combination thereof is fed. The material 68 is heated and mixed in the melt vessel and is then metered into the reactor 70 either by gravity or a hot pump 66.

FIG. 7 shows an example of a four stage condensing system which condenses vapors at four different temperatures. The main purpose of the condensing system is to cool the hot vapors enough for condensation to occur and for them to be in a liquid phase. The condensing system can also be configured to do this cooling in stages in order to separate different boiling ranges of the product. The result of a four stage condensing system is the separation of four distinct liquid products. Hot vapor 71 that is produced in the reactor is drawn through the condensing system starting with the first condenser 72. The vapor leaves the first condenser as either a liquid 74 at a temperature between 200° F. and a maximum of what the temperature of the reactor is or as a vapor 73. The vapor that exits the first condenser moves into the second condenser 76 where it is set at a lower temperature than the first condense but at least higher than 50° F.

Again the vapor leaves the second condenser either in liquid form 75 or as vapor 77 that proceeds into the third condenser 78. In this third condenser the vapor is again cooler further at a temperature lower than that of the second condenser but at least higher than 50° F. From this third condenser the vapor leaves as either liquid 79 or as vapor 80 into the fourth condenser 82. In this fourth condenser the vapor is cooled down significantly between about room temperature to at least above −30° F. to capture the last of the available liquids 83 with the remainder exiting as vapor 81 which will typically be light hydrocarbon gases comprised of non-condensable gases usually with a carbon number less than 5. Although specific temperatures and/or temperature ranges are mentioned in this example, other embodiments may operate at other temperatures or temperature combinations.

FIG. 8 shows another design in which reacted product from the first reactor 85 is fed back into a second reactor 90. After the material 84 is fed in through the reactor 85 and exits as vapor it enters the first condenser 86. From this first condenser the vapor can either move into the second condenser 87, or exit as product 91, in which case the product 91 can be redirected into the additional reactor 90 where it will be further subjected to further heating. This further reaction is done primarily to further crack heavy wax products with a high boiling point. From the second reactor, the liquid can either be redirected as oil feedback 88 back into the first reactor 85 for further heating or exit as liquid 91. The vapor from the second condenser will enter the third condenser 89 where again it will exit as either liquid product 93 or as a vapor gas product 94. In this example the vapor gas product 94 is not further cracked in a fourth condenser.

FIG. 9 shows an alternate design to FIG. 8 in which the vapor gas product 94 from the condenser 87 is redirected to use as the energy source of the combustion heat source 95 that heats the first reactor 85.

FIG. 10 shows the rear view of one embodiment of the reactor body 100. Inside the body lays the main reactor chamber 102 in which there lies internal reactor augers 104 and 106. In this example the first auger 104 rotates counter-clockwise and the second auger 106 rotates clockwise and hence they are counter-rotating augers. In some embodiments, the reactor augers help scrape the char and residue off the reactor wall and help carry it to the read end of the reactor body. In the illustrated embodiment, a third excavating auger 108 is placed perpendicular to the reactor body to capture the unreacted residue as it exits the reactor. The third auger moves the residue to its exit point 110 where it can be captured and stored.

FIG. 11 shows an alternate setup to the one used in FIG. 10. The internal reactor augers 114 and 116 are co-rotating (i.e., in the same rotational direction) inside the reactor body 112. The third excavating auger 118 is placed in line with the reactor body, directly underneath and behind the reactor body. The auger serves the same purpose as that of auger 108 in FIG. 10.

FIG. 12 shows the inside of the reactor body. In this embodiment, the reactor body 120 is rotating clockwise 122 and the internal rotating auger 126 is also rotating clockwise.

FIG. 13 shows an alternative embodiment of the invention. The reactor body 130 is rotating clockwise 132 whereas the internal rotating auger 134 is rotating counter-clockwise.

FIG. 14 shows a third alternative embodiment of the invention. In this case, the reactor body 140 is rotating counter-clockwise 142 and the internal rotating auger 144 is also rotating counter-clockwise 146.

FIG. 15 shows a fourth embodiment of the invention. In this case, the reactor body 150 is rotating counter-clockwise 152. In addition to a rotating auger 154, there is also a scraper 156 that removes solids that have fallen.

FIG. 16 shows a fifth embodiment of the invention. In this case, the reactor body 160 is rotating clockwise 162. There are two internal counter-rotating augers 164. One is rotating counter-clockwise 166 and one clockwise 168.

FIG. 17 shows a sixth embodiment of the invention. In this case, the reactor body 170 is rotating clockwise 172. There are two internal counter-rotating augers 174. The first is rotating counter-clockwise 176 and the second clockwise 178.

FIG. 18 shows a seventh embodiment of the invention. In this case, the reactor body 180 is rotating clockwise 182. There are two co-rotating augers 184. The first is rotating clockwise 186 and the second is also rotating clockwise 188.

FIG. 19 shows an embodiment of the invention in which two reactors and two condensers are used. The feed in 190 is fed into the first reactor 192 out of which both gas vapor 194 and char/residue 196 exit. The gas vapor enters the first condenser 198 from which two products 200 and 202 exit. The second product 202 as well as the char/residue from the first reactor enter the second reactor 204. Gas vapor 206 exits the second reactor and enters a second condenser 208. A third product 210 is created from the second condenser.

FIG. 20 illustrates how the feedstock 211 enters the reactor body 212 and the one or more augers or scrapers 213 push the feedstock forward. The reactor body 212 is kept at an incline 214 which is off horizontal and between 0 and 30 degrees. This incline helps with the reaction, allowing for adjustments to achieve an optimal residence time that increases the yield.

The reactor is rotated at a RPM as per the operating conditions and desired fuel output. The ideal RPM of the rotation of the reactor is guided by the RPM of the internal augers which mix the polymer containing materials inside the reactor. The rotating action of the reactor facilitates stirring and mixing of the feed materials on the inside and also allows for even heating of the exterior wall of the reactor chamber. The reactor heats and stirs the polymer containing material or wax to a state of being a liquid material. In one embodiment, the liquid in the reactor temperature is 400-550° C. In other embodiments, the liquid may be a higher or lower temperature. The reactor includes a longitudinally situated cylindrical tube which is indirectly heated on the exterior. This could be heated with hot gases from a combustion source or hot gases from an electric source.

In other embodiments, there can be a heating source which heats the length of the outer wall of the reactor. The temperature of the outer wall of the reactor as well as of the inner wall of the reactor may be monitored and controlled to ensure proper and stable reaction conditions. If the temperature is not steady it can be adjusted through the heating source to ensure a stable reaction. This helps to avoid both under-heating and over-heating the reaction which can lead to lower yields.

Inside the reactor chamber, there may be one or more augers which serve to stir the liquid reactant as well as scrape material from the reactor tube's interior walls. The augers are rotated such that the linear speed at which they carry material forward is controlled—the material that is moved is the dry char which is to be carried out of the reactor. The augers must be fast enough to accommodate the excavation of the char so that the char does not backup inside the reactor. The auger(s)' pitch and diameter are designed to operate within the necessary speed range to carry any solid char material out of the reactor at a rate that is equal to or greater than the rate at which char is produced.

In the reactor the liquid material is reacted through pyrolysis which breaks the long molecules into shorter molecules. When a molecule is sufficiently cracked and is heated to the chosen reaction temperature, typically between 400-550° C., this molecule will be changed to a vapor or gas phase. However, the exact temperature or range may depend on the type of reactants that are cracked and/or the combinations of products that are mixed with the reactants.

Changing the degree of the incline of the reactor so that it slopes between 0-30% grade allows for the throughput rate to be increased or decreased depending on the need. A plug or a baffle may be used near the back of the reactor body to reduce the heat loss and ensure the vapor does not condense at the exit where the char is being removed.

In some cases more crude oil will be desired, and at other times diesel. Once the gases are of the desired carbon length range, they are condensed in the condenser system to yield oil at the preferred boiling temperatures. The vapor that exists in the reactor will be drawn into the condenser system via a slight vacuum pressure differential. The vacuum in the reactor is in the range of −0.25" to −1.5" WC, whereas the vacuum in the condenser is in the range of −0.5" to 2.0" WC.

The condenser is used to cool the hot vapors that are produced from the reactor. When these vapors are cooled, a large portion of them will change from a vapor phase to a liquid phase. This cooling can be done in stages which will separate the vapors into different liquid product streams based on boiling point temperatures. The products are removed from the condenser at approximately the same rate they are produced.

In the condenser system the vapor hydrocarbon gases are systematically condensed by decreasing the temperature and thus condensing into chosen boiling ranges. The yield of oil from the feedstock can be impacted by the type of polymer containing material which is fed into the system, as different materials have different molecular structures which impact the potential oil yield.

A refrigerated condenser can condense more vapor—for example if one condenser is set at approximately normal room temperature it can get the light oil out of the product stream. The different products can be blended or used separately for specific end purposes such as diesel fuel, gasoline, crude oil, fuel oil, etc.

The inventors have used different catalysts with the invention and have found that some decrease the reaction time as well as increase the yield of oil. The use of particular catalysts improve the invention and can be added to the feedstock uniformly as it enters the reactor body.

FIG. 21 illustrates one embodiment of a control system that allows users of the invention to both monitor the overall reaction process, as well as automate or manually alter operating conditions. The inputs 216 which are different parameters that are monitored can include but is not limited to the feed rate and temperature of the polymer containing material, the RPM of the reactor, the temperature and pressure inside the reactor, the temperature and pressure inside the condensers, the oil level inside the condenser, the oil production rate, the yield of oil, the breakup of which types of oils are produced and in what percentage, the non-condensable gas flow rate, the gas yield, the char production rate, the char production yield, etc. The process monitor display 218 allows users to track each of the parameters. 218 can also include a controller which can either automatically adjust the parameters to ensure it remains within a targeted range (e.g. if the oil yield is low, the feed rate of the polymer containing materials can be slowed down), or can be manually altered by users (e.g. if more crude oil is desired, the user can manually alter the temperature and pressure inside one or more of the condensers). The outputs 220 are the reaction controls and include the feed rate of the polymer containing material, the heating source of the reactor, the mechanism which rotates the reactor, the pressure inside the reactor, the pressure inside the condensers, the oil drain rate of the condensers, etc.

FIG. 22 is an example of how the polymer containing material can be prepared pre-reaction. Polymer containing materials enter at 221 where they are typically polluted with unwanted fibers and dust. They are placed into the first apparatus 222 in which the material is dropped. The lighter undesired particles such as dust tend to float above 224 while the actual polymer containing materials drop to the bottom 223 where they are captured and pushed into the second apparatus 225. In the second apparatus 225 a fluid with a known density is chosen so that the polymer containing materials are separated by their densities. Those with a lower density will float at the top and those with a higher density will sink to the bottom 226. What floats can be then directed 227 into the third apparatus 228 in which the polymer containing materials are dried. Once the fluid has been separated out 229 in this drying process, the dry polymer containing materials 230 are ready for reaction.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
heating streams of feedstock of polymer containing materials prior to delivery into a cylindrical reactor body, the cylindrical reactor body comprising an axis perpendicular to a radius of a circular cross section of the cylindrical reactor body;
applying heat from an external heat source to the reactor body to heat an interior of the reactor body;
subjecting the heated streams of feedstock to pyrolysis in the heated reactor body;
rotating the reactor body;
rotating two or more internal augers within the interior of the reactor body, wherein the augers are each disposed to promote directional movement of materials within the reactor body in the direction from an inlet to an outlet of the reactor body, wherein the augers are positioned to scrape reacted feedstock from a portion of the reactor body adjacent to the augers as the reactor body rotates past the augers and move the reacted feedstock toward the outlet, wherein the augers are offset from the axis of the reactor body, wherein the augers are in a same half of the reactor body;

utilizing a plug or baffle at an end of the reactor body to reduce heat loss at an exit where char is moved out of the end of the reactor body;

outputting a portion of the reacted feedstock from the outlet of the reactor body; and putting a portion of the reacted feedstock through a condensing system to convert the reacted feedstock into petroleum products.

2. The method of claim 1, further comprising modifying a speed of rotation of the reactor body.

3. The method of claim 1, further comprising adjusting a temperature inside the reactor body through control of external heaters, where the temperature depends on a combination of the type of polymer containing material in the reactor body and the type of petroleum products to be produced.

4. The method of claim 1, further comprising performing further heating of the feedstock in one or more additional cylindrical reactor bodies oriented generally horizontally, wherein feedstock exiting from the reactor body is fed into the one or more additional cylindrical reactor bodies.

5. The method of claim 1, further comprising using a catalyst to facilitate the conversion of the feedstock into petroleum products in the reactor body.

6. The method of claim 1, further comprising changing a slope of inclination of the reactor body so that the conversion occurs at an incline with respect to-horizontal.

7. The method of claim 1, further comprising varying the speed of one or more of the internal augers.

8. The method of claim 1, further comprising varying temperatures inside the condensing system to adjust the type of petroleum product produced.

9. The method of claim 1, further comprising using feedback controls that provide guidance as to conditions required to vary yields of desired petroleum products.

10. The method of claim 1, further comprising floating the feedstock in fluids of known densities to separate the feedstock by density prior to heating and conversion.

11. The method of claim 1, further comprising processing the feedstock prior to reaction by separating the feedstock from other particles of a different weight and size, floating the feedstock in a fluid of known density to separate the feedstock by density, and drying the feedstock.

12. The method of claim 1, further comprising scraping material away from an internal surface of the reactor body as the reactor body rotates relative to a stationary scraper.

13. The method of claim 1, further comprising configuring at least two of the internal rotating augers to counter-rotate relative to each other to remove char from the cylindrical reactor body.

14. The method of claim 1, wherein the one or more augers are further positioned with overlapping clearance diameters.

15. The method of claim 1, further comprising controlling at least two of the internal rotating augers to co-rotate in a same rotational direction relative to each other to promote the same directional movement of the materials within the reactor body.

16. A method comprising:

processing feedstock of polymer-containing materials prior to reaction by separating the feedstock from other particles of a different weight and size, floating the feedstock in a fluid of known density to separate the feedstock by density, and drying the feedstock;

heating streams of the feedstock prior to delivery into a cylindrical reactor body, the cylindrical reactor body comprising an axis perpendicular to a radius of a circular cross section of the cylindrical reactor body;

applying heat from an external heat source to the reactor body to heat an interior of the reactor body;

subjecting the heated streams of feedstock to pyrolysis in the heated reactor body;

rotating the reactor body;

rotating one or more internal rotating augers within the interior of the reactor body, wherein the one or more augers are disposed to promote directional movement of materials within the reactor body in the direction from an inlet to an outlet of the reactor body, wherein the one or more augers are positioned to scrape reacted feedstock from a portion of the reactor body adjacent to the one or more augers as the reactor body rotates past the one or more augers and move the reacted feedstock toward the outlet, wherein the one or more augers are offset from the axis of the reactor body, wherein the one or more augers are in a same half of the reactor body;

utilizing a plug or baffle at an end of the reactor body to reduce heat loss at an exit where char is moved out of the end of the reactor body;

outputting a portion of the reacted feedstock from the outlet of the reactor body; and putting a portion of the reacted feedstock through a condensing system to convert the reacted feedstock into petroleum products.

17. The method of claim 16, comprising two or more internal augers, wherein the two or more augers are positioned with overlapping clearance diameters.

18. The method of claim 17, further comprising controlling at least two of the internal rotating augers to counter-rotate in different rotational directions relative to each other to promote the same directional movement of the materials within the reactor body.

19. The method of claim 17, further comprising controlling at least two of the internal rotating augers to co-rotate in a same rotational direction relative to each other to promote the same directional movement of the materials within the reactor body.

20. The method of claim 16, further comprising controlling, using feedback from one or more sensors, at least one of the temperatures within the reactor body, the speed of rotation of the reactor body, and the speed of the one or more augers.

* * * * *